Jan. 3, 1956     S. P. McLAUGHLIN     2,729,254
EGG OPENER
Filed Dec. 10, 1954

INVENTOR.
S. PARKS McLAUGHLIN
BY
Hyde, Meyer, Baldwin & Doran
ATTORNEYS

United States Patent Office 2,729,254
Patented Jan. 3, 1956

2,729,254
EGG OPENER

Samuel Parks McLaughlin, Coshocton, Ohio

Application December 10, 1954, Serial No. 474,356

3 Claims. (Cl. 146—2)

This invention relates to improvements in an egg opener of the general character in which an end portion of the egg shell is separated and lifted away from the remainder of the egg.

One of the objects of the present invention is to provide a simple device having a limited number of parts wherein opposed arcuate jaws have a spring connecting portion at one end which tends to hold the jaws separated and are provided with handles at the opposite end for closing the jaws toward the egg. The jaws are provided with inwardly directed needle-pointed teeth all lying in approximately the same plane so that the shell of the egg is fractured substantially entirely around the egg at one and the same time.

Another object of the present invention is the use of a single length of metal strip having spring characteristics to form the two jaws and the connecting spring portion. Preferably, the metal strip is of thin flat material having its flat sides extending generally at right angles to the plane of engagement of the needles into the egg shell so that the construction inherently holds the needles of the two jaws approximately in the same plane.

Another feature of the present invention is the provision of receiving cage portions secured on one side of the jaws and adapted to engage the top of the egg as the device is placed on the egg so as to locate the plane where the needles engage the egg shell. This receiving cage also is adapted to hold the severed portion of the egg so that it may be lifted away.

In a refinement of the invention, the needles which engage the egg shell are inclined slightly downwardly away from the receiving cage so that the natural action of the needles as they enter the egg is to lift the severed portion away from the rest of the egg and hold it while it is removed.

Still another preferred form of the invention is the arrangement of the two jaws each having an extent slightly less than half of a circle of larger diameter with the connecting portion between the jaws slightly less than a full circle of smaller diameter so that the device is easily formed and operates in the intended manner.

Other features include the arrangement of arcuate bars for securing the needles to the jaws, which bars may be either permanently or removably secured to the jaws. Also means may be provided for preventing too great opening movement of the jaws.

Other objects and advantages of my invention will be apparent from the accompanying drawings and description and the essential features thereof will be set forth in the appended claims.

In the drawings,

Fig. 2 is a side elevational view of the same; while

Figure 2:
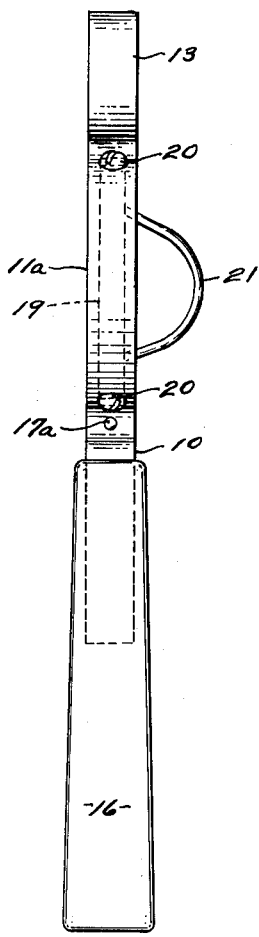

My device is easily and cheaply formed from a single strip of metal having spring characteristics. The preferred form as shown in the drawings is made of a strip of spring steel approximately 0.03 inch thick and 3/8 inch wide. The strip 10 is first bent to form an arcuate jaw 11a which preferably extends for slightly less than half of a circle of larger diameter, then the strip is bent back upon itself slightly at 12 and forms the connecting portion 13 which is slightly less than a full circle of smaller diameter, then the strip is again bent back upon itself slightly at 14 to form another arcuate jaw 11b like the first named jaw slightly less than half of the same larger circle. Preferably, but not necessarily, the strip is bent to form small semicircular loops at 15 at the free ends of the jaws and these provide limiting abutments which limit the movement of the jaws toward each other. The free ends of the strip of metal are provided with handles 16, preferably by inserting straight portions of the metal strip into the ends of the handles in any known manner. In the form shown, the jaws 11a and 11b each extend approximately 40 per cent around the circumference of the larger circle and the connecting portion 13 forms approximately 85 per cent of the circumference of a smaller circle.

It will be understood that the connecting portion 13 need not necessarily be circular in form so long as it provides a spring connection between the adjacent ends of the jaws normally urging them apart.

Figure 1:
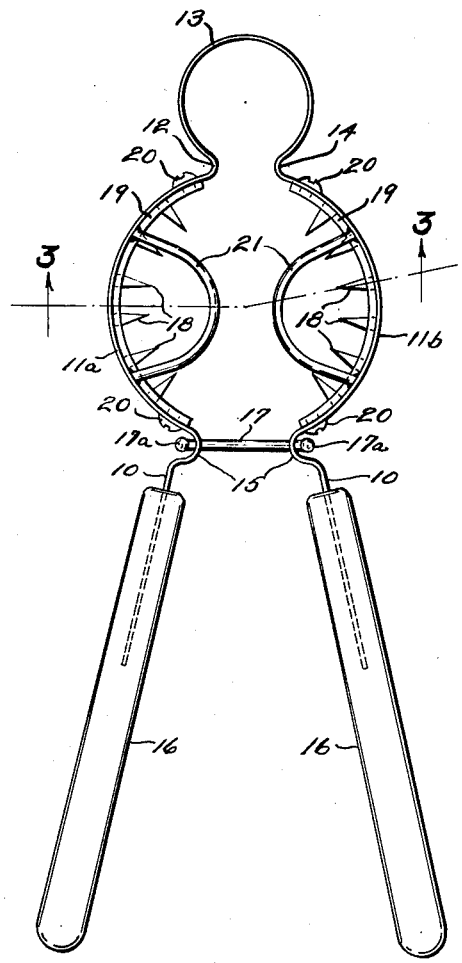
Fig. 1 is a top plan view of my improved device with the jaws in open position.
Figure 3:
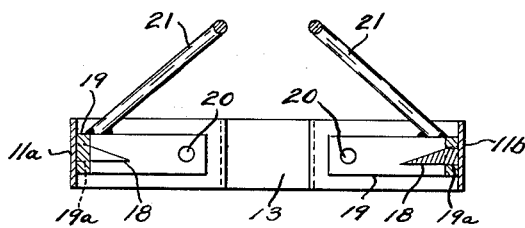
Fig. 3 is a transverse sectional view taken along the line 3—3 of Fig. 1.

The position of the parts in Fig. 1 shows them in unstressed condition with the spring connecting portion 13 fully expanded. This provides a natural limit to the opening of the jaws, but other limiting means may be provided as shown at 17 where a bar extends through suitable openings in the abutments 15 and is provided with limiting buttons 17a at each end thereof outside of the abutment.

A plurality of needles 18 are provided extending substantially radially inwardly from the jaws 11a and 11b. These needles may be secured to the jaws in any suitable manner, but a preferred form comprises the bars 19 which are arcuate in form and conform to the inner surface of the jaws. These jaws have spaced holes 19a adapted to receive the needles 18. The teeth are preferably conical in form having needle points. The relationship between the holes 19a and the base of the needles 18 is such that when the needles are inserted from the back of the bar to extend out the front thereof, the bar 19 firmly holds the needles in the desired position after the bar is secured to the jaw. The bars 19 may be either permanently or removably secured to the jaws. For the purpose of easy repairs to the needles, I prefer to secure the bars to the jaws by means of the removable screws 20.

Preferably, receiving cage portions 21 are provided secured one to each jaw and extending toward each other and away from the plane of the needles 18. These cage portions overlie a major portion of the diameter of the larger circle so as to engage the top of an egg and properly position the plane of the needles 18 when a fracture is to be made, and to aid in holding the severed portion of the egg and the shell between the needles 18 and the cage portions 21 for removal of the severed portion. A cheap and simple construction of the cage portion is provided by the semi-elliptical wires indicated in the drawings, which have their ends welded as shown in the drawings or otherwise suitably secured rigidly to the jaws 11a and 11b respectively.

In a preferred form of my invention, the needles 18 extend substantially radially inwardly and preferably inclined slightly downwardly so as to give a lifting movement to the upper portion of the egg shell as the needles penetrate, and thereby assist in separating the shell.

The operation of my device should now be apparent. It is first placed over the end of the egg with the retaining cage portions 21 resting on the end of the egg. By application of closing pressure on the handles 16 the substantially semi-circular fracturing jaws 11a and 11b are closed around almost the entire circumference of the egg at a point substantially above its center. The needles 18 enter the egg shell at approximately the same time over almost the entire circumference and penetrate only sufficiently to separate the shell. The severed portion may now be lifted away from the remainder of the egg and the device turned over. Upon release of pressure on the handles, the spring action of the connecting portion 13 releases the two jaws 6 and the shell may be retained in the receiving cage portions 21 for removal of the meat of a soft-boiled egg.

I have thus provided a novel device for severing one end of an egg after fracturing the shell thereof. My device comprises a small number of parts not likely to get out of order, and one which is easily washed clean.

What I claim is:

1. An egg opener comprising two rigid jaws, each jaw being slightly less than a half of a circle and having their concavities mutually facing, a portion of spring characteristics interconnecting said jaws and tending to separate them, a plurality of short needles spaced along and rigidly secured to said jaws and extending generally radially inwardly therefrom, said needles lying approximately in a common plane, two receiving cage portions secured one to each of said jaws and extending toward each other and away from the plane of said needles, whereby an egg placed in contact with said cage portions will position said needles properly to sever the top of the shell thereof and to hold the same when severed, and handles secured to the ends of the jaws remote from said interconnecting portion.

2. The combination of claim 1 wherein said needles are all inclined slightly away from said cage portions.

3. The combination of claim 1 including means operatively connected between the free ends of said jaws limiting opening movement of said jaws.

References Cited in the file of this patent

UNITED STATES PATENTS

| | | |
|---|---|---|
| 2,101,212 | Coppin | Dec. 7, 1937 |
| 2,247,016 | Halas | June 24, 1941 |

FOREIGN PATENTS

| | | |
|---|---|---|
| 348,900 | Germany | Feb. 20, 1922 |